Jan. 18, 1955  J. W. BURTON  2,699,635
THREE-POINT OFF-CENTER BREAKAWAY MOWER TRIP
Filed Oct. 2, 1952
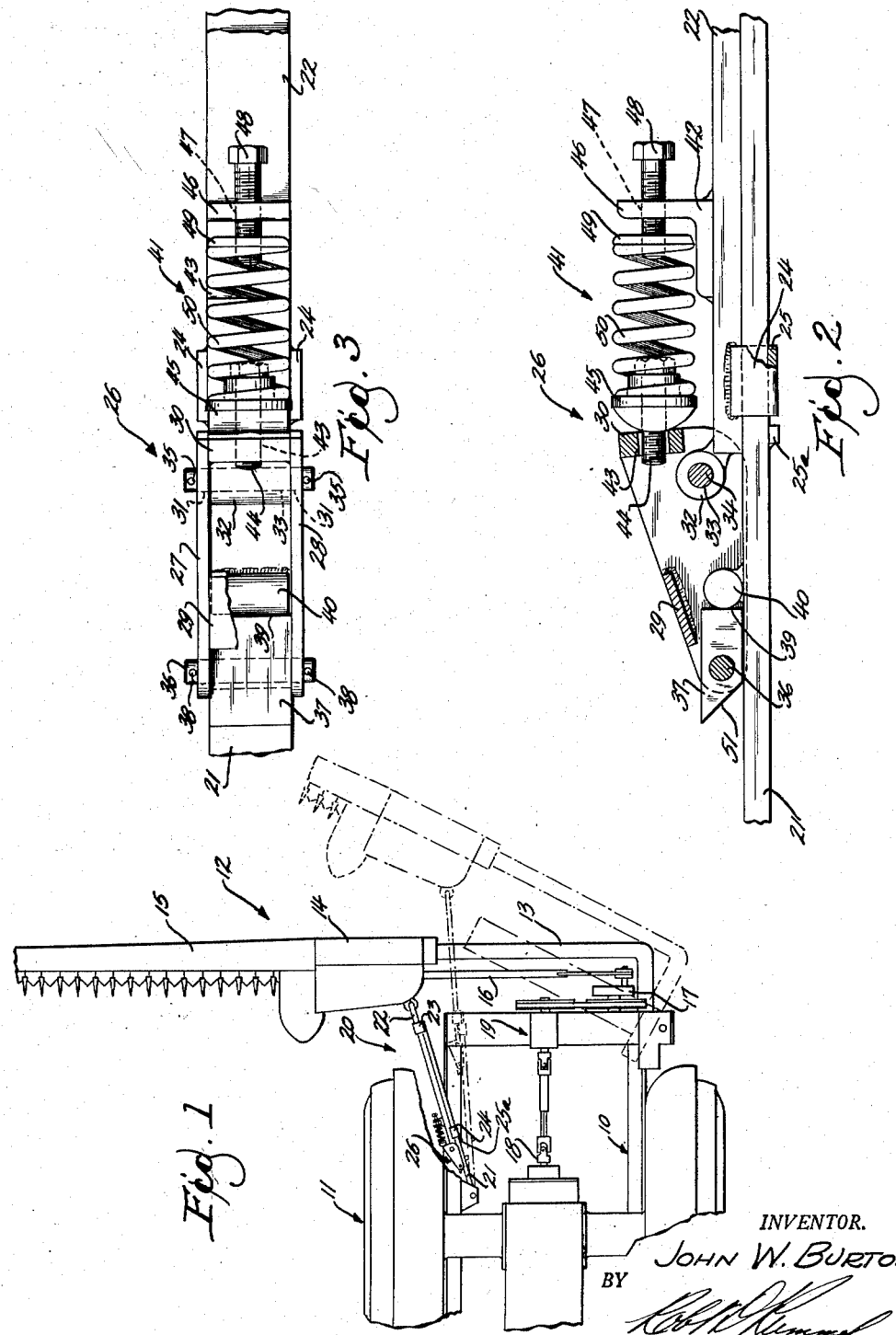
INVENTOR.
JOHN W. BURTON
BY
ATTORNEY 2,699,635

Patented Jan. 18, 1955

2,699,635

THREE-POINT OFF-CENTER BREAKAWAY MOWER TRIP

John William Burton, Indianapolis, Ind., assignor to J. I. Case Company, Racine, Wis., a corporation of Wisconsin Application October 2, 1952, Serial No. 312,700

11 Claims. (Cl. 56—25)

The present invention relates to a releasable latch or trip mechanism and particularly to a trip mechanism especially suited for use with a releasable pull bar mechanism of a releasable mower which is responsive to the force imposed upon the cutting mechanism of the mower tending to swing the mower rearwardly and which is releasable for permitting rearward swinging of the cutter bar and the mower in response to a given force.

It is an object of the present invention to provide a three-point off-center break-away latch mechanism which is comparatively easy and cheap to manufacture and which operates with a high degree of efficiency.

A more complete understanding of the features of the present invention will be had from the following description, taken in conjunction with the accompanying sheet of drawings in which Fig. 1 is a plan view of the rear portion of a tractor and a mower of the tractor mounted type embodying the present invention, with parts removed, showing the mower in operative position in full lines and in inoperative position in broken lines. Figure 2 is an enlarged plan view of a portion of the pull bar assembly showing the improved releasable trip mechanism, with parts broken away. And Fig. 3 is a right-side elevational view of the structure shown in Fig. 2, with parts broken away.

Figure 1 of the drawing illustrates a mower of the tractor-mounted type which can be of any suitable or well-known construction and which comprises in the present instance a supporting frame 10 carried rearwardly by a tractor 11. A mower assembly, designated generally as 12 and including a conventional push bar 13, is swingably hinged to the supporting frame 10 adjacent the stubble side thereof so as to be capable of swinging movement in a substantially horizontal plane. The mower assembly 12 also includes the customary yoke 14 which is carried adjacent the end of the push bar 13 and a laterally extending cutter bar mechanism 15 which is carried adjacent the end of the yoke 14. The cutter bar mechanism is actuated by means of a pitman 16 which is drivingly connected to a suitable crank 17 which is driven from the power take-off 18 of the tractor by means of a suitable driving mechanism 19. For maintaining the cutter bar mechanism in its proper operative position with respect to the tractor during operation, the yoke 14 and the supporting frame 10 are further interconnected at the grassward side of the supporting frame through the medium of a pull bar assembly 20 comprising a pair of extensible bars 21 and 22, the bar 22 being considered as the drawn element and being connected at one end to the yoke 14 and the bar 21 being considered as the draft element and connected at one end to the supporting frame 10. The bars 21 and 22 have secured to the opposite sides thereof and adjacent the respective ends thereof depending slides 23 and 24 which are each provided with inwardly turned portions 25, see Figs. 2 and 3, for maintaining the bars in sliding relationship. A stop 25A is welded to the bar 21 in the path of travel of the slide 24 for preventing sliding movement of the bar 22 with respect to the bar 21 in one direction upon the slide 24 being moved into abutment with the stop 25A, as will be more fully appreciated hereinafter, and the slides 23 and 24 are so spaced as to permit sufficient extension of the pull bar assembly 20 to allow the mower assembly 12 to swing rearwardly into its break-away position.

As previously suggested, a releasable trip mechanism 26 is interengaged between the respective extensible bars 21 and 22 for normally maintaining the bars 21 and 22 in the position shown in full lines in Fig. 1 wherein the cutter bar mechanism 15 is positioned in its normal working position, but which, in response to a given force tending to swing the cutter bar mechanism rearwardly about the substantially vertical hinge, is adapted to disengage the bar 22 from the bar 21 for permitting the cutter bar mechanism to swing rearwardly. The release mechanism 26 in the present instance comprises a pair of triangular shaped metal plates or bell cranks 27 and 28 which are held in equally spaced relationship by means of suitable spacers 29 and 30 adjacent opposite legs thereof. Suitable aligned openings 31 are formed in the respective bell cranks 27 and 28 adjacent the apex thereof and a boss 32 is secured adjacent the end of the bar 22 as by welding or the like. The boss 32 has formed therein a suitable bore 33 and a suitable pin 34 is insertable in the aligned openings 31 and the bore 33 when the bell cranks 27 and 28 are properly positioned with respect to the boss 32 for swingably supporting the bell cranks 27 and 28 with respect to the bar 22 for swinging in the plane of the bar 21. Suitable cotter pins or other fastening devices 35 are provided adjacent the opposite ends of the pin 34 for well known purposes. Adjacent the end of one leg of the respective bell cranks 27 and 28 is swingably secured by means of a suitable pin 36, an abutment block 37, which, when the bell cranks 27 and 28 are positioned as shown in Fig. 2, abuts against the bar 21 so as to provide a limit in one direction for swinging movement of the bell cranks 27 and 28. Suitable cotter pins 38 are provided adjacent the ends of the pin 36 preventing axial displacement of the pin as well known in the art. The end surface of the block 37, which is designated as 39, and which is preferably normal to the direction of the force imposed thereupon, is in abutting relationship with respect to an abutment or draft pin 40 which is carried by the bar 21 and secured thereto as by welding or the like. The draft pin 40 is preferably circular in cross section and formed of a size to permit the respective bell cranks 27 and 28 to receive the draft pin 40 therebetween when the respective bell cranks are in a latching position, as viewed in Figs. 2 and 3.

For normally maintaining the parts in the position shown in Fig. 2, a spring arrangement 41 is provided between the other leg of the respective bell cranks 27 and 28 and a suitable bracket 42 carried as by welding or the like on the bar 22. The spacer 30 has an opening 43 formed therein which receives therein a suitable bolt 44. A spring seat 45 is threadedly received on the bolt 44 and adapted to be held in abutting relationship with respect to spacer 30 upon the bolt 44, the latter being received freely in the opening 43. The bracket 42 is provided with a suitable leg 46 which has formed therein a threaded opening 47. A suitable bolt 48 is threaded into the opening 47 and the bolt carries adjacent the end thereof a spring seat 49 which is in substantial alignment with the spring seat 45. A suitable spring 50 is received between the spring seats 45 and 49 so as to be confined therebetween, and the compressive force exerted by the spring 50 is adjustable by means of the bolt 48.

It will be appreciated that the expansive force of the spring 50 tends to maintain the bell cranks 27 and 28 in the position shown in Fig. 2 wherein the abutment block 37 is in abutting relationship with respect to the bar 21 as shown. The arrangement is preferably such that the centers of pivotal connections 36 and 34 and the point of tangency between the abutting surface 39 and draft pin 40 are sufficiently out of alignment to cause the bell cranks to tend to swing outwardly and compress spring 50 when a force is applied against the bar 22 tending to extend the bar assembly 20. When a force is applied against the bar 22 tending to move bar 22 rearwardly relative to bar 21, as by means of an obstruction in the path of travel of the cutter bar mechanism 15 as previously suggested, the bell cranks 27 and 28 are caused to swing outwardly or in an unlatching direction against the expansion force exerted by the spring 50. Upon outward swinging movement of the bell cranks 27 and 28, the abutment block 37 is swung about the axis of pin 36 so that the abutting surface thereof, designated as 39, rolls upon the circumferential surface of the draft pin 40. This tendency of the abutment blocks 37 to roll upon the circumference of the draft pin 40 about the axis of the pin 36 is effected by forming the draft pin 40 of a size sufficient to position a plane through the axis thereof and through the point of tangency between the surface 39 and the draft pin 40 inwardly or in the direction of bar 21 from a parallel plane through the axis of pin 36. It will also be appreciated that the force of the spring 50 maintains the spring seat 45 in abutting relationship with the spacer 30 and that the opening 43 is sufficiently large to accommodate the bolt 44 therein even upon the bell cranks 27 and 28 being moved in an unlatching direction sufficiently to release the abutment block 37 from the draft pin 40. Upon the abutment 37 being released from the draft pin 40, the bar 22 is free to slide rearwardly with respect to bar 21 a distance necessary to relieve the parts from strain and to permit the cutter bar mechanism 15 to move out of the path of the obstruction. The normal operative force necessary to swing the bell cranks 27 and 28 against the force exerted by the spring 50 so as to release the latch mechanism can quickly be adjusted by means of the bolt 48 which, as previously suggested, controls the confinement of the spring 50 and consequently the compressive force exerted by the spring tending to urge the bell cranks in a latching direction.

After the abutment block 37 has been released from the draft pin 40 sufficiently to permit the bar 22 to slide rearwardly relative to the bar 21, the latch mechanism is positioned in a cocked position rearwardly of the draft pin 40 with the abutment block 37 in sliding abutting relationship with respect to the bar 21. The repositioning of the latch mechanism 26 in a cocked position after its release from the draft pin 40 is occasioned by the compressive force of the spring 50 as previously suggested. To reposition the mower assembly in its proper position with respect to the direction of travel of the tractor, the tractor is backed sufficiently to slide bar 22 forwardly with respect to bar 21. The forward surface of the abutment block 37 is formed with an oblique or cam surface 51 so that as the bar 22 is moved forwardly, the oblique face of the abutment block 37 will readily ride over the draft pin 40 sufficiently to swing the bell cranks 27 and 28 in an unlatching direction so as to enable the abutting surface 39 of block 37 to be presented in draft engaging abutting relationship with respect to draft pin 40 when the bar 22 has been moved forwardly sufficiently for slide 24 to abut stop 25ª. The spacer 29 limits the swingable movement of the abutment block 37 about the axis of pin 36 so that the abutment block is always in its proper position with respect to bar 21 when the latch mechanism is moved to its cocked position. Forward movement of the tractor and consequently of the bar 21 will draft engage the draft pin 40 in its proper abutting position with respect to surface 39 of block 37 and the mower is once again in an operative position.

Having now described the present invention, what I claim and desire to protect by Letters Patent is:

1. A latch mechanism for releasably connecting a drawn element to a draft pin comprising a bell crank swingably connected to said drawn element and swingable in the plane of said draft pin, and abutment block carried by said bell crank and swingable about an axis substantially parallel to the axis of swingable movement of said bell crank, said abutment block being caused to be moved into abutting relationship with respect to said draft pin when said bell crank is moved in a latching direction, a spring arrangement for urging said bell crank in a latching direction, and means for limiting the springing movement of said bell crank and said abutment block in a latching direction for positioning said abutment block with respect to said draft pin so that the axis of swingable movement of said abutment block and the axis of swingable movement of said bell crank are out of alignment with respect to the point of tangency between said abutment block and said draft pin, said bell crank being urged in an unlatching direction in response to a predetermined force tending to move said drawn element relative to said draft pin.

2. A latch mechanism for holding a pair of extensible bars in locked position and adapted to release said bars for relative sliding movement in response to a given force comprising a bell crank swingably carried by one of the bars and swingable in the path of the other bar, an abutment block swingably carried by the bell crank and caused to be brought into abutting relationship with respect to said other bar upon said bell crank being swing in a latching direction, an abutment on said other bar in abutting relationship with respect to said abutment block, the axis of swingable movement of said bell crank and the axis of swingable movement of said abutment block being out of alignment with the point of tangency between said abutment block and said abutment, and a spring arrangement for urging said bell crank in a latching direction, said bell crank being moved in an unlatching direction in response to a force tending to extend said extensible bars sufficient to overcome the force exerted by said spring arrangement tending to move said bell crank in a latching direction.

3. A latch mechanism for use with a pair of extensible bars comprising a swingable member swingably secured to one of said bars and swingable in the plane of the other of said bars, an abutment formed on the other of said bars, a swingable block carried by said swingable member and positioned to be in abutting relationship with respect to said abutment when said swingable member is moved in a latching direction, the axis of said swingable member and the axis of said swingable block being out of alignment with the point of tangency between said swingable block and said abutment, and means for urging and said swingable member in a latching direction and responsive to a predetermined force tending to extend said extensible bars.

4. A latch mechanism for holding a pair of extensible bars in locked position and adapted to release said bars for relative sliding movement in response to a given force tending to extend said bars comprising a bell crank swingably carried adjacent the end of one of said bars and swingable in the plane of the other of said bars, an abutment block swingably carried by said bell crank and caused to be brought into abutting relationship with respect to said other bar upon said bell crank being swung in a latching direction, a draft pin on said other bar in abutting relationship with respect to said abutment block, said draft pin being substantially circular in cross section and the abutting surface of said abutment block being substantially normal to said other bar when said abutment block is in abutting relationship with respect thereto, the axis of swingable movement of said bell crank and the axis of swingable movement of said abutment block being out of alignment with respect to the point of tangency between said abutment block and said draft pin, and a spring arrangement carried by said bell crank for urging said bell crank in a latching direction, said bell crank being swung in an unlatching direction for releasing said draft pin in response to a predetermined force tending to extend said extensible bars.

5. A latch mechanism for holding a pair of extensible bars in locked position and adapted to release said bars for relative sliding movement in response to a given force comprising a bell crank carried adjacent the end of one of said bars and swingable in the plane of the other of said bars, an abutment block carried adjacent the end of one of the legs of said bell crank and swingable about an axis substantially parallel to the axis of swingable movement of said bell crank, said abutment block being caused to be moved in abutting relationship with respect to said other bar upon said bell crank being swung in a latching direction, a draft pin carried on said other bar and adapted to be moved in abutting relationship with respect to said abutment block for propelling the first mentioned bar in accordance with movement in one direction of said other bar, said axis of swingable movement of said bell crank and said axis of swingable movement of said abutment block being out of alignment with respect to the point of tangency between said abutment block and said draft pin, the point of tangency between said abutment block and said draft pin being disposed towards said other bar with respect to a plane parallel to said other bar through the axis of swingable movement of said abutment block, and a spring arrangement for urging said bell crank in a latching direction, said bell crank being moved in an unlatching direction in response to a predetermined force tending to extend said extensible bars.

6. In a tractor mounted mower having a rear supporting frame, a mower assembly carried by the rear supporting frame so as to be capable of swinging movement in the horizontal plane, and a pair of extensible bars connected between the grassward side of said supporting frame and the grassward side of said mower assembly, the improvement comprising a latch mechanism for holding said pair of extensible bars against relative sliding movement when the mower assembly is operatively positioned with respect to the direction of travel of the tractor, said latch mechanism comprising a bell crank swingably carried by one of the bars and swingable in the plane of the other bar, an abutment block swingably carried by one leg of said bell crank and caused to be brought into abutting relationship with respect to said other bar when said bell crank is swung in a latching direction, a draft pin fixed on said other bar in abutting relationship with respect to said abutment block upon said one bar tending to move in one direction relative to said other bar, the axis of swingable movement of said bell crank and the axis of swingable movement of said abutment block being out of alignment with respect to the point of tangency between said abutment block and said draft pin, and a spring arrangement connected to the other leg of said bell crank for urging said bell crank to swing in a latching direction, said bell crank being urged in an unlatching direction in response to a force tending to extend said extensible bars sufficient to overcome the force exerted by said spring arrangement.

7. In a tractor mounted mower having a rear supporting frame, a mower assembly carried by the rear supporting frame and capable of swinging movement in the horizontal plane, and an extensible bar assembly comprising a draft bar and a drawn bar connected between the supporting frame and the mower assembly, the improvement comprising a latch mechanism for holding said extensible bar assembly against relative sliding movement when the mower assembly is operatively positioned with respect to the direction of travel of the tractor, said latch mechanism comprising a bell crank carried by said drawn bar and swingable in the plane of said draft bar, an abutment block carried by said bell crank adjacent the end of one leg thereof and swingable about an axis substantially parallel to the axis of swingable movement of said bell crank, said abutment block being caused to abut said draft bar upon swinging movement of said bell crank in a latching direction, a draft pin fixed to said draft bar and positioned in abutting relationship with respect to said abutment block upon said abutment block being in abutting relationship with respect to said draft bar, said draft pin being substantially circular in cross section, the axis of swingable movement of said abutment block and the axis of swingable movement of said bell crank being out of alignment with respect to the point of tangency between said abutment block and said draft pin, and a spring arrangement for urging said bell crank in a latching direction, said bell crank being urged against the force exerted by said spring arrangement in an unlatching direction in response to a predetermined force tending to extend said extensible bar assembly.

8. In a tractor mounted mower having a rear supporting frame, a mower assembly connected to said rear supporting frame and swingable in the horizontal plane, and an extensible bar assembly connected between the grassward side of said mower assembly and the grassward side of said supporting frame, the improvement comprising a latch assembly for releasably holding said pair of bars against relative sliding movement for holding the mower assembly in its operative position with respect to the direction of travel of the tractor, said latch mechanism comprising a bell crank swingably connected to said bar connected to said mower assembly adjacent the forward end thereof for swinging movement about an axis substantially normal to the direction of movement of said bar, an abutment block adjacent the end of one leg thereof and swingable about an axis substantially parallel to the axis of swingable movement of said bell crank, said abutment block being caused to be brought into abutting relationship with respect to the bar connected to said supporting frame when said bell crank is swung in a latching direction, a draft pin fixed to said bar connected to said supporting frame and in the path of movement of said abutment block when a force exerted against said mower assembly tends to lengthen said extensible bar assembly, the axis of swingable movement of said bell crank and the axis of swingable movement of said abutment block being out of alignment with respect to the point of tangency between said abutment block and said draft pin, and a spring arrangement connected adjacent the end of the other leg of the bell crank for urging the bell crank in a latching direction, said bell crank being urged in an unlatching direction in response to a force exerted against said mower assembly tending to extend said extensible bar assembly sufficient to overcome the force exerted by said spring arrangement.

9. In an overload release the combination of a member having substantially parallel spaced pivots, means exerting a force on one pivot in a direction away from the other pivot, a force receiving abutment disposed between said pivots, an element pivoted on said other pivot in compression between it and said abutment, the point of contact of said element with said abutment being displaced from the common plane of the axes of said pivots whereby said element will tend to swing in one direction and cause pivoting of said member in said direction and escape of said element from said abutment, spring means positioned to oppose pivoting of said member in said direction and means opposing said spring means to block movement of said member by said spring means beyond the position of displacement aforesaid into a position where said pivots and said point of contact are in line.

10. In a harvester characterized by a crop engaging unit subject to occasional inadvertent engagement with obstructions; a releasable propelling unit for said crop engaging unit comprising a pair of juxtaposed relatively longitudinally movable members, one constituting a driving unit and the other connected with the crop engaging unit and constituting a driven unit, a member pivoted to one of said units and having another pivot spaced longitudinally of the other unit and axially parallel to the pivotal connection of the member with the first mentioned unit, a force receiving abutment on the other unit disposed between the pivots on said pivoted member, an abutment block pivoted on the second mentioned pivot to be engaged against said force receiving abutment by relative longitudinal movement of said driving unit and said driven unit in one direction, one of said abutments having a rounded face in contact with the other abutment, the point of contact betwen the abutments being displaced toward the other unit from a plane including both of said pivots, and yieldable means arranged to resist pivoting of the pivoted member in a direction away from that in which said point of contact is displaced from said plane of said pivots.

11. In a harvester characterized by a crop engaging unit subjected to occasional inadvertent engagement with obstructions; a releasable propelling unit for said crop engaging unit comprising a pair of juxtaposed relatively longitudinally movable members, one constituting a driving unit and the other connected with the crop engaging unit and constituting a driven unit, a member pivoted to one of said units and having another pivot spaced longitudinally of the other unit and axially parallel to the pivotal connection of the member with the first mentioned unit, a force receiving abutment on the other unit disposed between the pivots on said pivoted member, an abutment block pivoted on the second mentioned pivot to be engaged against said force receiving abutment by relative longitudinal movement of said driving unit and said driven unit in one direction, one of said abutments having a rounded face in contact with the other abutment, the point of contact between the abutments being displaced toward the other unit from a plane including both of said pivots and said abutment block having a cam surface on the end remote from the surface engaging said force receiving abutment and so disposed as to cause said block after release, upon reverse movement between said abutment and said block, to be cammed out of the path of said abutment for resetting of said releasable propelling unit, and yieldable means arranged to resist pivoting of the pivoted member in a direction away from that in which said point of contact is displaced from said plane of said pivots.

References Cited in the file of this patent

UNITED STATES PATENTS

| 2,269,980 | MacDonald | Jan. 13, 1942 |
| 2,504,686 | Hilblom | Apr. 18, 1950 |

FOREIGN PATENTS

| 36,202 | Germany | June 24, 1886 |